Dec. 22, 1964     D. C. GILLILAND     3,161,966
GRAVITY LEVEL
Filed May 16, 1962
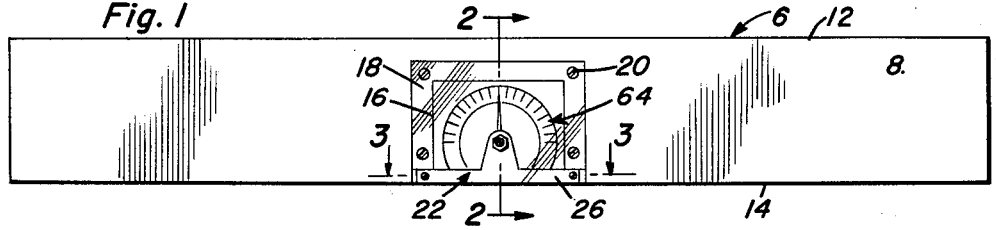
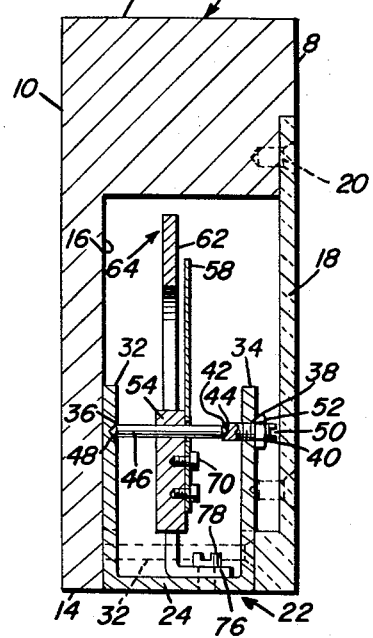
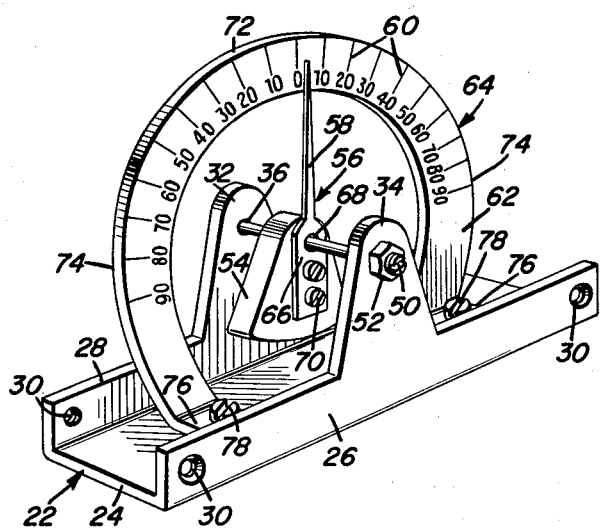
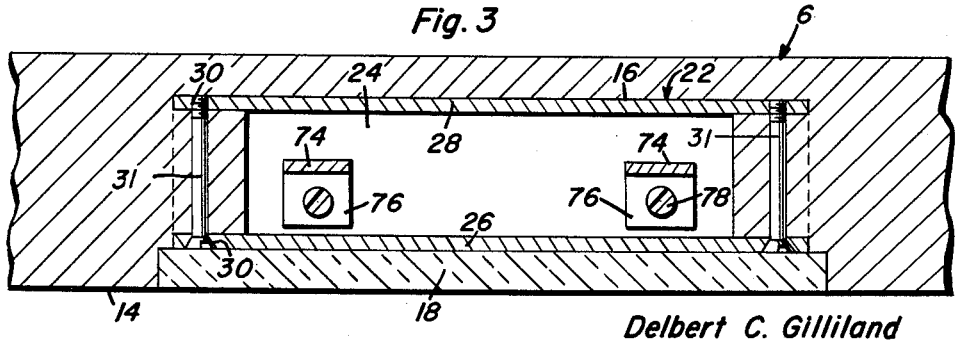
Delbert C. Gilliland
INVENTOR.

United States Patent Office 3,161,966
Patented Dec. 22, 1964

3,161,966
GRAVITY LEVEL
Delbert C. Gilliland, Walnut St., McArthur, Ohio, assignor of one-third to Harry R. Kwatkosky, McArthur, Ohio
Filed May 16, 1962, Ser. No. 195,174
4 Claims. (Cl. 33—215)

The present invention relates to a manually usable level of a type which is structurally and functionally designed and adapted for use by carpenters, masons, and mechanics and users in general, and is such in construction that it may be readily and reliably used to accurately ascertain and determine the plane of one structural part or member in relation to the horizontal plane of a cooperating member.

As will be hereinafter more clearly evident the level herein revealed has to do with a type which employs a graduated dial, an indicating hand or pointer which is movable relative to the graduations on the dial, said pointer carried by a weight suspended from a rotatable shaft. Persons conversant with the part to which the invention relates are aware that many and varied patents similar to each other and also to the present invention have been issued. It follows that it is an object of the instant endeavor to structurally, functionally and otherwise improve upon prior art adaptations and, having done so, to provide a level which is different and distinct, is accurate and reliable and is such that it will serve the purposes for which it is intended.

Another object of the invention is to provide a weight-equipped level which is such in design and construction that it will appeal to and be endorsed by tool and instrument makers and retailers and will meet the needs and requirements of those who are called upon to resort to the use of a level in carrying out work requirements.

More specifically, the concept has to do with a self-contained unit having unique component parts which are assembled for efficient cooperation and wherein said units is capable of being inserted into a recess or socket in conventional-type stocks and frames wherein the recess is such as to accommodate a transparent window or shield which is arranged to expose the graduated dial and the coacting indicating hand or pointer.

In carrying out a preferred embodiment of the invention a simple and economical channel-shaped fixture supports a shaft. The shaft in turn supports the weight and the weight supports the indicating finger or pointer. The pointer has its tip coperating with suitably marked graduations on a flat face of a horseshoe-shaped bracket. The legs of the bracket are removably bolted to the fixture to the left and right of the rockable weight carrying shaft.

The shaft is cradled between upstanding lugs and the ends of the shaft are conically pointed and mounted for sensitive operation, the mounting means at one end being adjustable to permit the shaft to operate efficiently not only when first assembled but after it has been in use some time.

These together with other objects and advantages which will become subsequently apparent reside in the details of construction and operation as more fully hereinafter described and claimed reference being had to the accompanying drawings forming a part hereof, wherein like numerals refer to like parts throughout, and in which:

FIGURE 1 is a front elevation showing the improved unit embodied in a wooden or an equivalent elongated flat-faced stock or base;

FIGURE 2 is an enlarged view with parts in section and elevation taken on the vertical line 2—2 of FIGURE 1;

FIGURE 3 is a horizontal section on the line 3—3 of FIGURE 1; and

FIGURE 4 is a view in perspective on a large scale which shows the essence of the invention; namely, the aforementioned self-contained, ready-to-install unit.

With reference now to the views of the drawing the numeral 6 designates an elongated rectangular stock such as is used in levels employed by carpenters, masons and mechanics. As shown in FIG. 2 this stock is provided with spaced parallel front and back faces 8 and 10, a top surface 12 and a bottom surface 14. In order to accommodate the invention, the unit seen in FIG. 4 the central portion of the stock is mortised as at 16 to define a recess or pocket. The open side of this recess is covered by a glass window or transparent protective shield 18 held in place by the fasteners 20. It is in this enclosed pocket that the novel measuring unit of FIG. 4 is enclosed for use. This novel unit comprises a principal component part here designated as a fixture 22. Specifically it comprises a linearly straight member which is channel-shaped in cross-section and embodies a flat web or wall 24 provided along lengthwise edges with upstanding spaced parallel front and back flanges 26 and 28 having bolt holes 30 to accommodate assembling and retaining bolts 31 in the manner illustrated in FIG. 3. These bolts serve to position and retain the channel in the pocket or mortise 16. The median portions of the flanges are provided with spaced parallel upstanding lugs 32 and 34, the interior surface of the lug 32 being provided with a shallow conical cavity or depression 36 which provides a bearing. This cavity is in line with a hole 38 which is provided in the upper portion of the lug 34 and which constitutes a bearing, broadly speaking, in the sense that it is threaded to accommodate the screwthreads on a setscrew 40 the setscrew being passed therethrough and the inner end portion 42 having a conical depression to accommodate the conical pointed end 44 on a spindle or shaft 46. This shaft spans the space between the two lugs and the other conical end or pointed terminal 48 is journaled for oscillation in the depression or bearing 36. Thus we have bearings in the opposed lugs to accommodate an intervening shaft with the shaft freely turnable.

The righthand end portion of the setscrew seen in FIGS. 2 and 4 is provided with a kerf 50 to accommodate the screwdriver for adjusting the setscrew and the setscrew is held in an adjusted position by way of the lock nut 52 with which it is provided as shown in FIG. 2. Thus the shaft may be readily applied and removed and whenever it is necessary an adjustment may be made to more effectually support the freely turnable shaft.

A sector-shaped weight 54 is fixed on and suspended from the median portion of the shaft. This weight is poised and is self-centering and under the forces of gravity maintains the normal hanging or suspended position depicted in FIG. 4 in particular. The weight is also a mount for an indicator, the indicator being designated at 56. This indicator embodies an indicating finger or pointer 58 which is arranged to cooperate with the graduations 60 on the flat face 62 of a substantially horseshoe-shaped dial 64. The lower end of the pointer is provided with an attaching plate 66 having a hole 68 which surrounds the shaft and which is retained on the weight by fastening screws 70.

In connection with this dial means 64 it will be noted that it is substantially horseshoe-shaped and is proportioned so that the median part 72 arches over the weighted pointer-equipped shaft so that it is in proper relation to and so that the depending legs 74 are properly located within the channel or trough of the fixture. The lower free ends of the legs are laterally offset at 76 and secured by screws or the like 78 to the web 24.

It will be noted that the channel fixture fits with requisite nicety into the space 16 and when secured with the bolts 31 the exterior of the bottom of the web is flush with the straight edge surface 14. Novelty is also thought to reside in the onepiece channel or fixture 22 with the upstanding lugs 32 and 34 providing bearings to suspend the intervening freely rotatable shaft 46 and to permit adjustment thereof by way of the setscrew. Then too, the fact that the bracket 64 is an independent element facilitates manufacturing and assembling and also permits the graduations to be arranged from zero to 90 as shown or set up under some other system metric or otherwise.

Inasmuch as persons familiar with levels are conversant with the measuring and leveling problem and since the construction herein shown and described appears to be simple and practical, the features and advantages and mode of use will be apparent. Accordingly, a more lengthy description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. For installation and use in a recess provided therefor in the lengthwise bottom of a conventional-type straight-edged mechanic's level stock; a prefabricated self-contained ready-to-install unit structurally designed and uniquely adapted to be fitted and enclosed for use in said recess, and unit embodying an elongated channel-shaped member constituting a fixture, said channel-shaped fixture embodying a central web provided along opposite lengthwise edges with spaced parallel flanges, the median portions of said flanges being provided with similarly constructed and performing upstanding lugs, said lugs being positioned in spaced-apart parallelism and being provided with aligned shaft bearings, one bearing being axially adjustable toward and from the other bearing, a shaft spanning the space between said lugs and having needlepoint terminal ends seated and operable in their respective bearings, a sector-shaped counterweight depending into the space between said lugs and having an upper end thereof connected to a median portion of the shaft whereby said weight is thus adapted to function as a pendulum, a horseshoe-shaped bracket having a median portion arching over the shaft and having depending legs provided with terminal feet and said feet being superimposed on and removably attached to a top side of the aforementioned web, said bracket having a flat face provided with measuring graduations, and a pointer having a pointed upper end cooperable with the graduations and having a lower end secured to and operable by said weight.

2. The structure defined in claim 1 and wherein the respective legs of said bracket are spaced inwardly from the respective open ends of the channel portion of said channel-shaped fixture, the flanges on said fixture being provided adjacent terminal end portions thereof with bolt holes in a manner to facilitate bolting the overall unit in the aforementioned recess while at the same time permitting the unit to be removed whenever necessary or desired for cleaning and repair.

3. A device of the class described comprising a fixture having a pair of opposed lugs, one lug having a surface thereof provided with a conical depression providing a bearing, the other lug having a machine screw mounted therein with one end of the machine adjustable and provided with a lock nut engaging the lug, the other end of said screw projecting into the space between the lugs and having a conical depression aligned with the first-named depression, a shaft spanning the space between the lugs and having needle-point ends freely rotatable in the adjacent respective bearings, a horseshoe-shaped bracket carried by said fixture and having a portion arching over the shaft and a face thereof suitably having an arched bracket having depending legs with lateral feet removably fastened on said fixture, said legs straddling the shaft, and a weight on the shaft provided with an upstanding index finger, said index finger having movable and sweeping association with the graduations on said bracket.

4. The structure defined in claim 2 and wherein said pointer has a pilate portion at a lower end thereof, said plate portion being superimposed on and detachably secured to a vertical face of said weight, said plate portion being narrower than the weight, said plate occupying a position precisely midway between cooperating marginal edges of said weight and also having a hole therein through and beyond which the cooperating portion of the shaft extends, said hole being of an outside diameter greater than the outside diameter of said shaft.

References Cited in the file of this patent
UNITED STATES PATENTS

| | | |
|---|---|---|
| 567,347 | Kelly | Sept 8, 1896 |
| 1,359,474 | Wernick | Nov. 16, 1920 |
| 1,602,276 | Lutz | Oct. 5, 1926 |
| 2,498,083 | Kennedy et al. | Feb. 21, 1950 |
| 2,602,241 | Delaney | July 8, 1952 |
| 2,796,676 | Vize | June 25, 1957 |